Feb. 26, 1935. M. MAYER ET AL 1,992,873
ORNAMENT AND METHOD OF MAKING THE SAME
Filed May 25, 1934  2 Sheets-Sheet 1
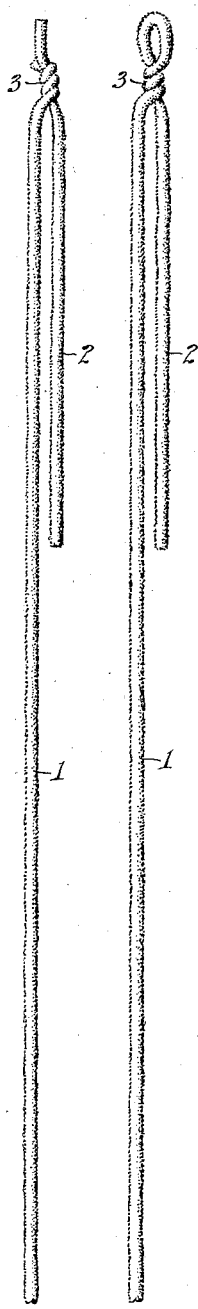
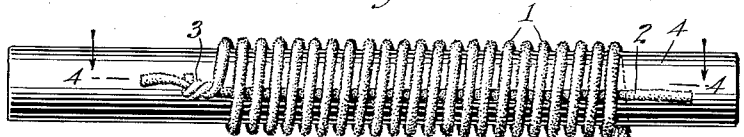
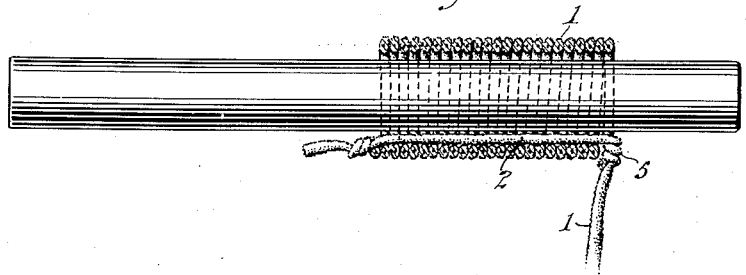
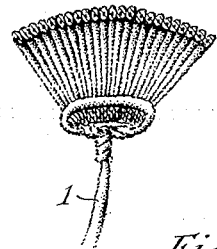
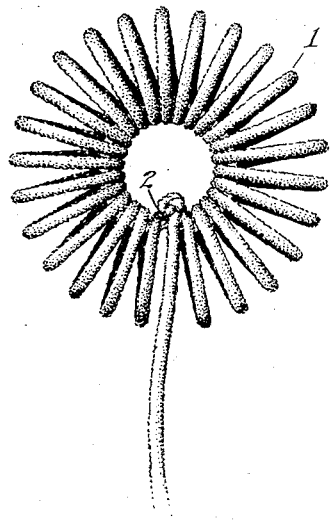
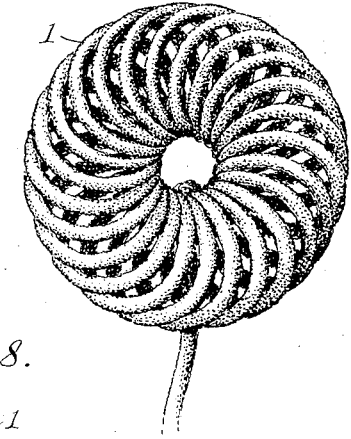
WITNESSES
Edw. Thorpe
S. W. Foster
INVENTORS
Morris Mayer
Hattie H. Schwed
BY
Munn, Anderson & Liddy
ATTORNEY Feb. 26, 1935. M. MAYER ET AL 1,992,873
ORNAMENT AND METHOD OF MAKING THE SAME
Filed May 25, 1934 2 Sheets-Sheet 2

WITNESSES
Edw. Thorpe
S.W. Foster

INVENTORS
Morris Mayer
Hattie H. Schwed
Munn, Anderson & Liddy
ATTORNEY

Patented Feb. 26, 1935

1,992,873

UNITED STATES PATENT OFFICE 1,992,873

ORNAMENT AND METHOD OF MAKING THE SAME

Morris Mayer and Hattie H. Schwed, New York, N. Y.

Application May 25, 1934, Serial No. 727,538

7 Claims. (Cl. 41—13)

This invention relates to ornaments and method of making the same, an object of the invention being to provide an attractive ornament embodying novel steps in the method of making the same;

A further object is to provide an ornament which is composed of strands of suitable material which can be variously shaped to form flowers, leaves, flower petals and other ornaments.

A further object is to provide attractive ornaments which can be manufactured at a reasonably low price and which can be variously shaped to represent artificial flowers or other objects.

With these and other objects in view the invention consists in certain novel features of construction and certain novel series of steps in the method, all of which will be more fully hereinafter described and pointed out in the claims.

In the accompanying drawings:—

Figure 1 is a view in elevation illustrating a main strand and a binding strand secured thereto, and this view is illustrative of the first step of our improved method;

Figure 2 is a view similar to Figure 1 illustrating a modification;

Figure 3 is a view in elevation showing the main strand coiled or looped around a mandrel or form with the binding strand extending through the loops, and this view is illustrative of the second step of our improved method;

Figure 4 is a view in sectional elevation showing the end of the binding strand secured to the end of the main strand and the loops compressed, and this is illustrative of the third step of our improved method;

Figure 5 is a view in sectional elevation showing the strands removed from the mandrel or form and the binding strand tightened around the loops, compressing the loops at one side and the binding strand secured to the main strand, and this is illustrative of the fourth step of our improved method;

Figure 6 is a view in elevation at right angles to Figure 5 showing the loops separated and in circular formation, and this is illustrative of the fifth step of our improved method.

Figure 7 is a view in elevation showing the loops somewhat flattened to form an imitation flower, which is illustrative of the final step of the method;

Figure 8 is an exaggerated view in cross section through one of the strands which illustrates chenille, which is well adapted for use in our invention;

Figure 9:
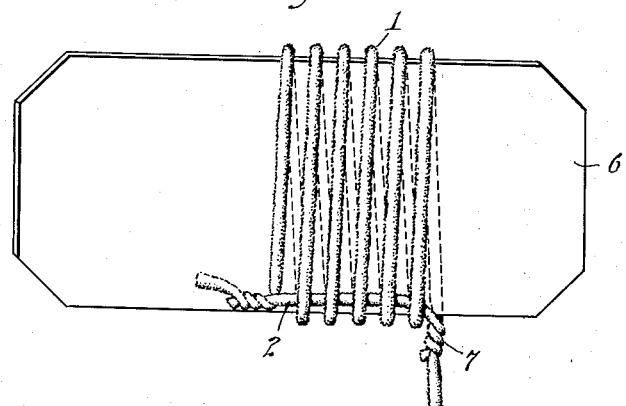
Figure 9 is a view in elevation illustrating a modification.

In carrying out our invention we may employ any suitable material, but we find that material known on the market as chenille is well adapted for the purpose and we will assume that this material is used, although it is to be understood that the invention is not limited in this respect. Chenille is desirable because of its lustre and many colors, and because of the fact that it contains in its strands a wire which maintains the shape given to the chenille. Furthermore, the material is compressible and readily bent into the desired shapes.

In carrying out the invention we provide a main strand 1 to which is secured a binding strand 2. In Figure 1 the main strand and binding strand are separate pieces which are twisted together, as shown at 3, but it is also possible to form these strands 1 and 2 of the same length of material, as illustrated in Figure 2 of the drawings, where it will be noted that the end of the strand of material is bent upon itself and the two strands twisted together, as shown at 3, and it is to be understood that the strands may be formed of either separate pieces or of the same piece, and in forming the two strands as illustrated this indicates the first step of the method.

Any suitable shape and size of mandrel or form 4 may be used in accordance with the design of the ornament to be made. In any event, however, in carrying out the second step of the method the binding strand 2 is positioned longitudinally of the mandrel 4 and the main strand 1 is looped or coiled about the mandrel and preferably the coils or loops are spaced slightly apart. When the desired number of loops are made the loops are drawn together and the end of the binding strand 2 is twisted about or secured to the end of the main strand 1, as shown in Figure 4 of the drawings, which is illustrative of the third step of the method.

The article thus far made is then removed from the mandrel and the opposite ends of the binding strand 2 and the main strand 1 are drawn toward each other to compress the loops at one side, and said strands are twisted together, as illustrated in Figure 5 of the drawings, which constitutes the fourth step of the method.

The loops are then separated in circular formation, as indicated in Figure 6 of the drawings, and flattened or distorted, as indicated in Figure 7 of the drawings, in accordance with the article or object to be made, and these views, 7 and 8, are illustrative of later steps in the method although it is to be distinctly understood that these later steps may be greatly varied in accordance with the object to be made.

Figure 7 is illustrative of the last step in the method to form a flower, although it is perfectly obvious that it may be otherwise shaped to form other objects.

Figure 10:
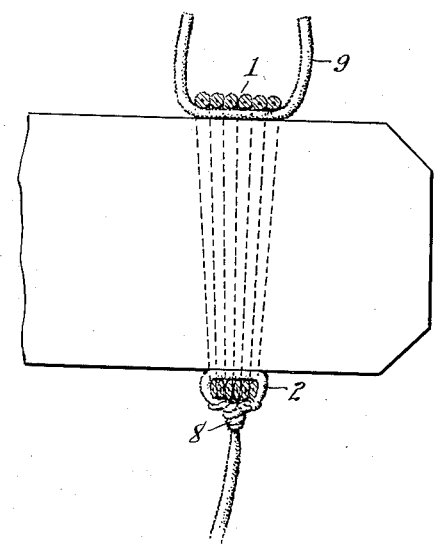
Figures 10 and 11 are views in sectional elevation illustrating steps of the method in connection with the modification.
Figure 11:
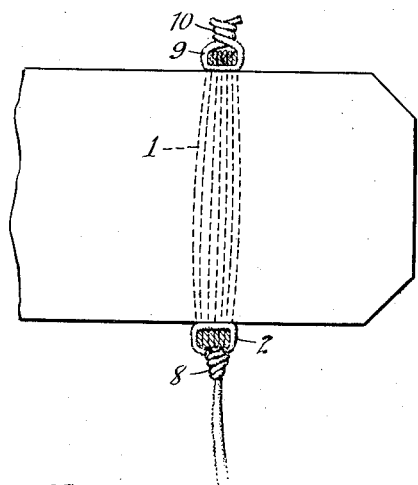
Figure 12:
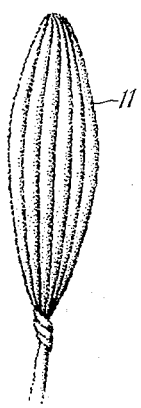
Figure 12 is a view in elevation showing an imitation leaf or flower petal.
Figure 13:
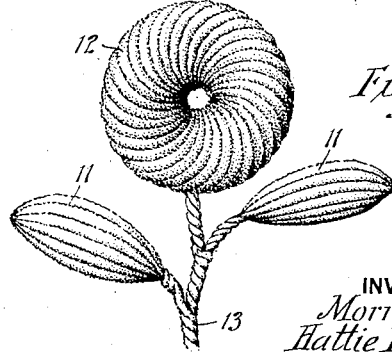
Figure 13 is a view in elevation showing an arrangement of imitation flower.

Figures 9, 10, 11 and 12 are illustrative of a variation in the method in the formation of artificial leaves, flower petals and other analogous objects. In forming leaves or flower petals we preferably employ a flat mandrel 6 and loop the main strand 1 around the same, with the binding strand 2 within the loops. When a sufficient number of loops has been made one end of the binding strand is secured to the main strand as illustrated in Figure 7. The loops are then drawn together and the opposite end of the binding strand 2 is twisted around the main strand, as shown at 8. In this stage in the method a second binding strand 9 is projected through the loops and located at the edge of the mandrel 6, and the ends of this binding strand are twisted together, as shown at 10, the excess material of the binding strand 9 being removed. The article thus formed can then be removed from the mandrel and shaped to form a leaf, such as indicated at 11 in Figure 12 of the drawings. It is, of course, obvious that the material may be made up to form imitation flowers 12, leaves 11 and a stem or stems 13 in any suitable or desired arrangement.

While we have illustrated the formation of a flower, leaves and stem, it is obvious that many forms of imitation plants and other objects may be made, and while chenille is the preferable material employed the invention is broad enough in its scope to include any material which may be utilized for the purpose.

What we claim is:

1. An ornament comprising a main strand consisting of a series of loops, and a binding strand extending through the loops and secured at its ends to the main strand and binding the loops together.

2. An ornament composed of a single main strand consisting of a plurality of loops, and a binding strand extending through the loops and secured at both ends to the main strand and binding the loops together at one side only.

3. An ornament comprising a main strand consisting of a plurality of loops, and binding strands extending through the loops at opposite sides of the loops securing the loops together and compressing the material of the loops.

4. The herein described method including the provision of a main strand, and a binding strand affixed thereto, then looping the main strand around a form with the binding strand within the loops, and next securing the ends of the binding strand to the loops and to the end of the main strand.

5. The herein described method including the provision of a main strand and a binding strand affixed thereto, then looping the main strand around a form with the binding strand within the loops, next securing the ends of the binding strand to the loops and to the end of the main strand then positioning a second binding strand through the loops, and then securing the second binding strand within the loops and around the same at a point opposite to the first mentioned strand.

6. The herein described method of making ornaments and the like, consisting in securing a binding strand to a main strand, looping the main strand around a form and around the binding strand, forcing the loops together, and securing the binding strand around the loops to compress the loops at one side, and then distorting the loops to form an ornament.

7. The herein described method, including the provision of a relatively long main strand and a relatively short binding strand secured at one end to one end of the main strand, then looping the main strand around a form with the binding strand within the loops, said loops constituting a continuous series of spaced coils, then pressing the coils together, then securing the free end of the binding strand to the main strand at the last coil, then securing the joined ends of the main strand and the binding strand to the main strand around the outside of the coils or loops and pressing the loops at one side of the assemblage.

MORRIS MAYER.
HATTIE H. SCHWED.